United States Patent [19]

Natale

[11] Patent Number: 4,487,252
[45] Date of Patent: Dec. 11, 1984

[54] DUCT ARRANGEMENT TO ELIMINATE EXIT GAS TEMPERATURE IMBALANCE ON ROTARY HEAT EXCHANGERS

[75] Inventor: Joseph J. Natale, Enfield, Conn.

[73] Assignee: Combustion Engineering, Inc., Windsor, Conn.

[21] Appl. No.: 521,772

[22] Filed: Aug. 9, 1983

[51] Int. Cl.³ .................. B01F 5/00; F28D 19/00
[52] U.S. Cl. .................. 165/7; 366/336; 366/341; 366/337; 137/602; 55/135; 55/267
[58] Field of Search .................. 165/7; 137/602; 366/336, 337, 338, 341; 55/135

[56] References Cited

U.S. PATENT DOCUMENTS

| | | | |
|---|---|---|---|
| 3,051,452 | 8/1962 | Nobel | 366/337 |
| 3,481,392 | 12/1969 | Woolard et al. | 165/7 |
| 3,538,982 | 11/1970 | Fiori | 165/7 |
| 3,963,221 | 6/1976 | Yi | 366/341 |
| 4,197,905 | 4/1980 | Gollnick et al. | 165/7 |

Primary Examiner—Albert W. Davis, Jr.
Attorney, Agent, or Firm—Robert L. Olson

[57] ABSTRACT

A pair of parallel flow rotary regenerative air heaters (16, 18) which extract heat from the combustion gases exhausted from a furnace (10). The gases, after giving up heat in the air heaters, flow to an electrostatic precipitator (30). In order to eliminate any temperature unbalance across the width of the main duct (28) leading to the precipitator, the duct (24) from the first air heater is connected to the main duct in such a manner that the hottest portion of the gases (H-1) are introduced along one side, and the relatively cooler portion (C-1) of the gases are introduced along the other side. The duct (26) from the second air heater is connected to the main duct in such a manner that the relatively cooler portion of the gases (C-2) are introduced along said one side, and the hottest portion of the gases (H-2) are introduced along said other side, thereby eliminating temperature unbalances across the width of the main duct.

3 Claims, 2 Drawing Figures

DUCT ARRANGEMENT TO ELIMINATE EXIT GAS TEMPERATURE IMBALANCE ON ROTARY HEAT EXCHANGERS

BACKGROUND OF THE INVENTION

In steam generators it is common to heat the combustion air flowing to the furnace by extracting heat from the combustion gases being exhausted from the furnace. One efficient means of accomplishing this is by using a rotary regenerative air heater. With the present concern about air pollution, many plants now clean up the exhaust gases by placing an electrostatic precipitator downstream of the air heater. Because many of the noxious components contained in the exhaust gases will form highly corrosive acids, which could cause extensive damage to the precipitator and duct work if the temperature of the gas stream falls below the dew point temperature, it is important to maintain the exhaust gas temperature above this level. From an efficiency point of view, it is desirable to extract as much heat from the exhaust gases as possible. By reason of these two contrasting positions, it is desirable to maintain the temperature of the exhaust gases flowing from the air heater to the precipitator within a narrow, critical range. This presents problems when a rotary regenerative air heater is used, since there are temperature unbalances across the width of the duct downstream of the air heater. This problem is increased when more than one air heater is used, and there may be a slight difference in temperature of the gases flowing to each air heater.

SUMMARY OF THE INVENTION

In accordance with the invention, an electrostatic precipitator is located downstream of a pair of rotary regenerative air heaters placed in parallel flow relationship with each other. In order to even out the temperature of the gases across the width of the main duct upstream of the precipitator, the duct extending from one of the air heaters is connected to the main duct in such a manner that the hot portion of the gases enters near side (1), and the relatively cold portion enters near side (2). The duct extending from the other of the air heaters is connected to the main duct such that the hot portion of the gases enters near side (2), and the relatively cold portion enters near side (1). This crossover introduction results in balanced temperatures across the width of the main duct leading to the electrostatic precipitator.

DESCRIPTION OF THE PREFERRED EMBODIMENT

Figure 1:
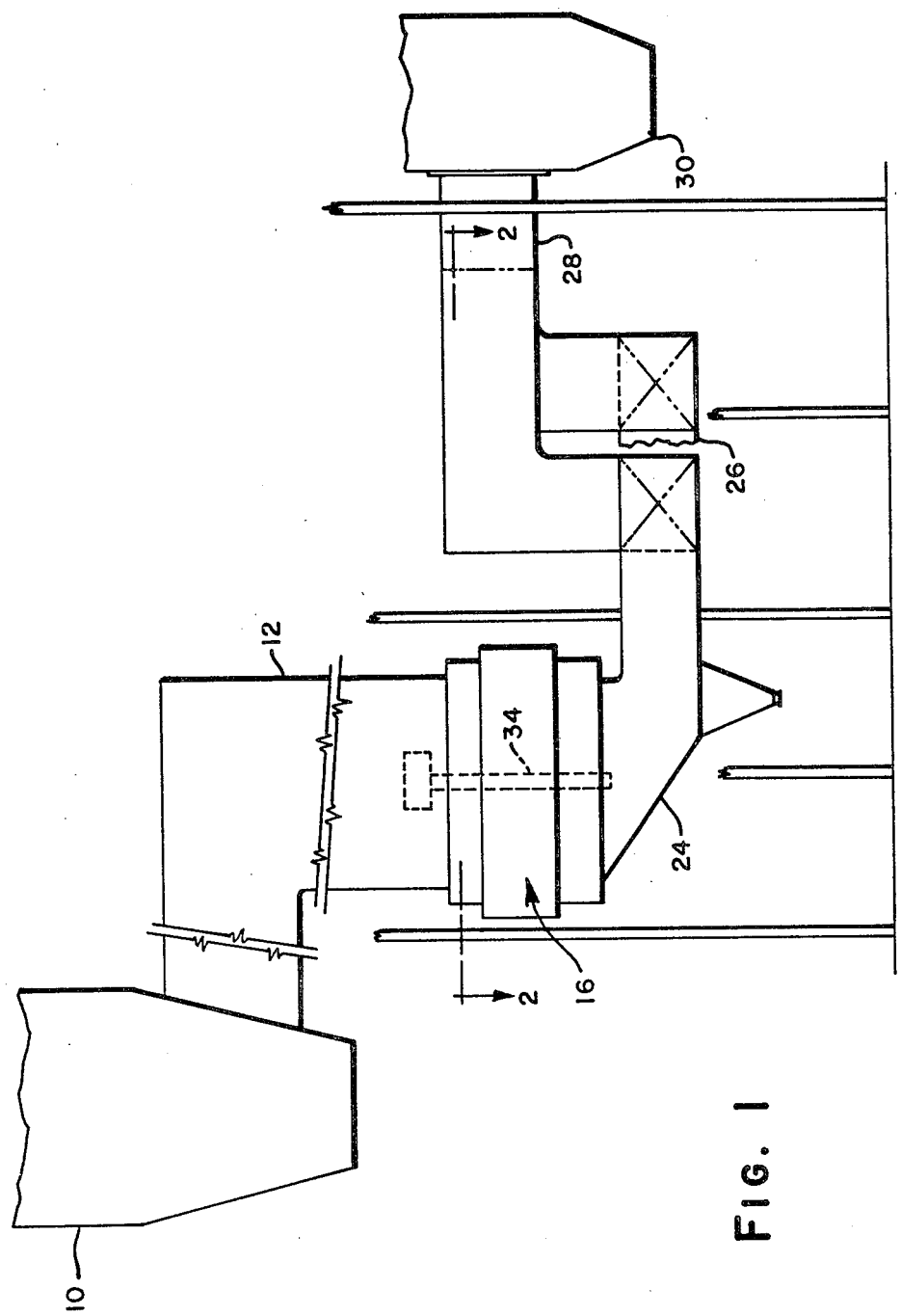
FIG. 1 is a sectional side view of an air heater and electrostatic precipitator arrangement incorporating the gas temperature balancing feature of the invention.

Looking now to the drawings, numeral 10 designates the rear gas pass of the furnace of a steam generator. After the combustion gases traverse the furnace and rear gas pass, and the heat exchange surface therein, they still contain a substantial amount of heat. In order to recover this heat, the exhaust gases pass through a split duct 12, 14 (FIG. 2) to a pair of rotary regenerative air heaters 16, 18, where air flowing through ducts 20 and 22 is heated. The heated air flows to the furnace, where it supports combustion of the fuel. The exhaust gases exit the air heaters through ducts 24 and 26, joining into a single stream in main duct 28. This main duct 28 flows to one or more electrostatic precipitators 30 (FIG. 1), where ash and other foreign solids are removed from the gases before they are discharged into the atmosphere.

Figure 2:
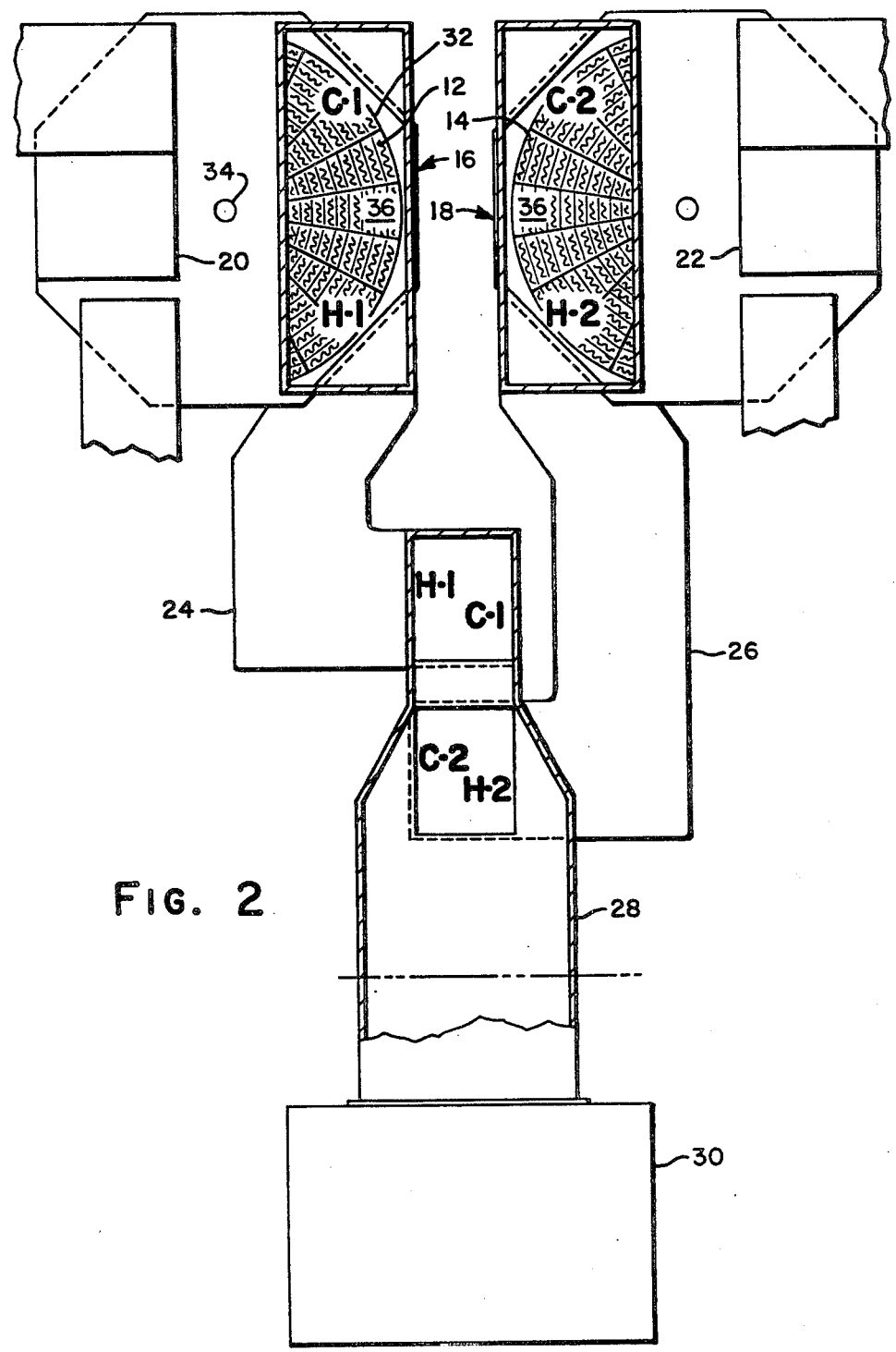
FIG. 2 is a view taken on line 2—2 of FIG. 1.

As shown in FIG. 2, the rotary regenerative air heater 16 contains a rotor 32 (shown partially) which rotates about a central shaft 34. The rotor is completely filled with metal heat absorbing plates 36 (only some of which are shown) which are stacked so as to present flow passageways therebetween. The rotor turns slowly, making two or three complete revolutions per minute. Each rotary air heater is identically constructed. The exhaust gases entering through the duct 12 and then passing through the passageways in the rotor 32 give up heat to the heat absorbing plates. Then as the rotor rotates further in a clockwise direction, this heat is transferred to the air flowing through the duct 20 on the left-hand side as shown in FIG. 2. After given up heat to the air, the stacked plates are again heated by the exhaust gases. It should be apparent that because of the greater temperature differential between the heat absorbing plates and the exhaust gases entering a point C-1, a large amount of heat will be extracted from the exhaust gases along this side of the duct. By the time the rotor has traversed the duct 12, rotating approximately 180° during a period of 10 or 15 seconds, the temperature differential between the entering exhaust gases and the heat absorbing plates is much less at point H-1, and thus relatively less heat will be extracted from exhaust gas at point H-1 than at point C-1. Thus the gas leaving the air heater alongside C-1 may be 25–50° F. cooler than the gas at the other side H-1 of the duct. The same is true of air heater 18, where the gas alongside C-2 is cooler than that leaving alongside H-2. Thus if the air heater is initially sized during design to extract sufficient heat from the exhaust gases to bring it down to a point close to the dew point temperature, there could be a substantial amount of moisture settling out of the gases in the electrostatic precipitator in the flow along the sides of the ducts C-1 and C-2, if no steps were taken to overcome this unbalance. This moisture could combine with noxious components of the gas and ash to form highly corrosive and damaging acids. In addition, in furnaces where the fuel is tangentially fired, there is often a temperture unbalance of the exhaust gases flowing from the furnace. Thus when these gases are split to flow to the two air heaters, the temperature of the gases entering the two air heaters may be slightly different. Thus the gases C-1 and C-2 may be slightly different. Also H-1 would be different from H-2. This adds to the temperature unbalance problem.

In order to overcome this problem, the gases in ducts 24 and 26 are introduced into the main duct 28 leading to the precipitator in such a manner that all of the temperature unbalances are eliminated. Duct 24 is connected to the bottom of main duct 28 with the hottest gases H-1 entering along the left-hand side as shown in FIG. 2, and the relatively cooler portion of the gas C-1 entering along the right-hand side. Duct 26 is connected to the bottom of main duct 28 downstream of the connection of duct 24, with the hottest gases H-2 entering along the right-hand side, and the relatively cooler portion C-2 entering along the left-hand side. Thus the H-1 gases blend with the C-2 gases, and the C-1 gases blend with the H-2 gases, resulting in gas of fairly even temperature across the entire cross section of the duct.

I claim:

1. In combination, a first duct having an inlet and outlet end, through which first hot gases are flowing, first means positioned within the first duct for creating a temperature unbalance of the hot gases across the width of the first duct, a second duct having an inlet and outlet end, through which second hot gases are flowing, second means positioned within the second duct for creating a temperature unbalance of the hot gases across the width of the second duct, a third duct, said third duct having a first wall, and a second wall opposite to the first wall, the outlet end of the first duct being connected to the third duct, the outlet end of the second duct being connected to the third duct at a point downstream of the connection between the first and third duct, the first duct being connected to the third duct in such a manner that the hotter gases flowing therethrough enter the third duct adjacent to said first wall, and the relatively cooler gases flowing therethrough enter the third duct adjacent to said second wall, and the second duct being connected to the third duct in such a manner that the hotter gases flowing therethrough enter the third duct adjacent to said second wall, and the relatively cooler gases flowing therethrough enter the third duct adjacent to said first wall, so that there is little or no temperature unbalance of the flowing hot gases across the width of the third duct.

2. The combination set forth in claim 1, wherein the means for creating the temperature unbalances in the first and second ducts are rotary regenerative heat exchangers.

3. The combination set forth in claim 2, wherein there is an electrostatic precipitator positioned in the third duct downstream of the connections of the first and second ducts.

* * * * *